(No Model.)

J. W. McINDOE & B. B. EMERY.
GLOVE FASTENING.

No. 434,114. Patented Aug. 12, 1890.

Witnesses:
Walter E. Lombard
C. A. McClure

Inventors:
James W. McIndoe,
Benjamin B. Emery.
by N. C. Lombard
Attorney.

UNITED STATES PATENT OFFICE.

JAMES W. McINDOE AND BENJAMIN B. EMERY, OF BOSTON, MASSACHUSETTS.

GLOVE-FASTENING.

SPECIFICATION forming part of Letters Patent No. 434,114, dated August 12, 1890.

Application filed March 29, 1890. Serial No. 345,845. (No model.)

*To all whom it may concern:*

Be it known that we, JAMES W. McINDOE and BENJAMIN B. EMERY, both of Boston, in the county of Suffolk and State of Massachusetts, have invented jointly a new and useful Improvement in Eyelets, of which the following, taken in connection with the accompanying drawings, is a specification.

Our invention relates to eyelets for use in fastening boots, gloves, and other articles, and has for its object the production of an elastic or expansible metal eyelet fitted to engage with a solid head or knob of a stud of a diameter somewhat larger than the opening through the eyelet; and it consists in certain novel features of construction, arrangement, and combination of parts, which will be readily understood by reference to the description of the drawings, and to the claims hereinafter given, and in which our invention is clearly pointed out.

Figure 1:
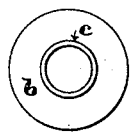
Figure 4:
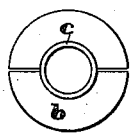
Figure 7:
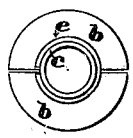
Figure 10:
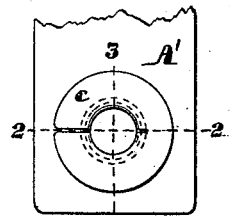
Figure 2:
Figure 6:
Figure 9:
Figure 11:
Figure 3:
Figure 5:
Figure 8:
Figure 12:
Figure 13:
Figure 14:
Figure 16:
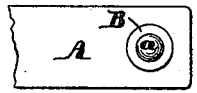
Figure 15:
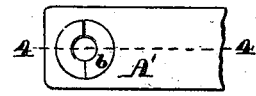
Figure 17:

Figures 1, 2, and 3 of the drawings are respectively a plan, an elevation, and a sectional elevation of an eyelet of ordinary construction. Figs. 4, 5, and 6 are respectively a plan, an elevation, and a sectional elevation of an eyelet nearly divided into two parts by a central slit extending through its flange and a portion of the shank. Figs. 7, 8, and 9 are similar views of our improved eyelet complete and ready for setting in the boot, glove, or other article. Fig. 10 is a plan of our improved eyelet set in the end of a leather strap. Fig. 11 is a section on line 2 2 on Fig. 10. Fig. 12 is a section on line 3 3 on Fig. 10. Figs. 13 and 14 are respectively a plan and an elevation of the spring-ring. Fig. 15 is a plan of the set eyelet drawn to a smaller scale and looking at the side opposite to that shown in Fig. 10. Fig. 16 is a plan of the stud or button with which said eyelet is to engage when used as a fastening, said button or stud being set in the end of a strap or other article which it is desired to secure to the strap in which is set the eyelet; and Fig. 17 is a section through the eyelet on line 4 4 on Fig. 15, and showing the stud and its strap in elevation.

In the drawings, A and A', although shown as two pieces of straps, may represent the two parts or sides of a boot, glove, or any other article that it is desired to secure together. In the part A is firmly secured by riveting the stud B, having a round or nearly-spherical head *a* and a neck of a somewhat smaller diameter.

To carry out the object of our invention and produce an eyelet that has an opening through it when in its normal position smaller than the diameter of the head *a* of said stud, we first form an ordinary eyelet—such, for instance, as is shown in Figs. 1, 2, and 3. We then nearly divide said eyelet into two equal parts by cutting entirely through its flange *b* and nearly through its shank *c* on one side and about one-half (more or less) through the shank on the opposite side, as shown in Figs. 3, 4, and 5, the two halves of the eyelet being connected only by short sections *d d'* of the shank at its end, as shown. A steel cut spring-ring *e*, made of a diameter somewhat less than the diameter of the eyelet-shank, is placed upon said shank in close proximity to the flange *b* by expanding said spring, as shown in Figs. 7, 8, and 9. The slit through the flange and shank of the eyelet is so cut that when the eyelet is inserted in the article where it is to be set and the end of the shank is expanded and turned down upon the material to secure it therein the section *d'* connecting the two parts of the eyelet will break, while the section *d* remains intact, as shown in Fig. 10. When this is done, the tension of the spring-ring tends to press the two parts of the eyelet toward each other and thus reduce the diameter of the opening through the eyelet in a direction at right angles to the line of separation, while at the same time said spring will permit said opening to expand to receive the head *a* of the stud B, when it will contract again to embrace the neck of said stud, as shown in Fig. 17.

Care should be taken to so form the clinching-dies for setting the eyelet that the spring-ring *e* shall not be clamped between the two flanges of the eyelet and thus be rendered inoperative.

What we claim as new, and desire to secure by Letters Patent of the United States, is—

1. As an improved article of manufacture, an eyelet having a tubular shank with a flange at one end, said flange and the greater part of the shank being separated into two parts by a longitudinal slit, in combination with a cut spring-ring surrounding said shank in close proximity to the flange.

2. In a fastening for boots, gloves, and other articles, the combination of a headed stud set in one part of the article to be fastened, an eyelet having a tubular shank with a flange at one end, said flange and the greater part of the shank being separated into two parts by a longitudinal slit set in the other part of said article, and a cut spring-ring surrounding the shank of said eyelet between its flange and clinched end and arranged and adapted to press the two parts of said eyelet toward each other, substantially as described.

In testimony whereof we have signed our names to this specification, in the presence of two subscribing witnesses, on this 26th day of March, A. D. 1890.

JAMES W. McINDOE.
BENJAMIN B. EMERY.

Witnesses:
N. C. LOMBARD,
C. A. McCLURE.